Figure 1:
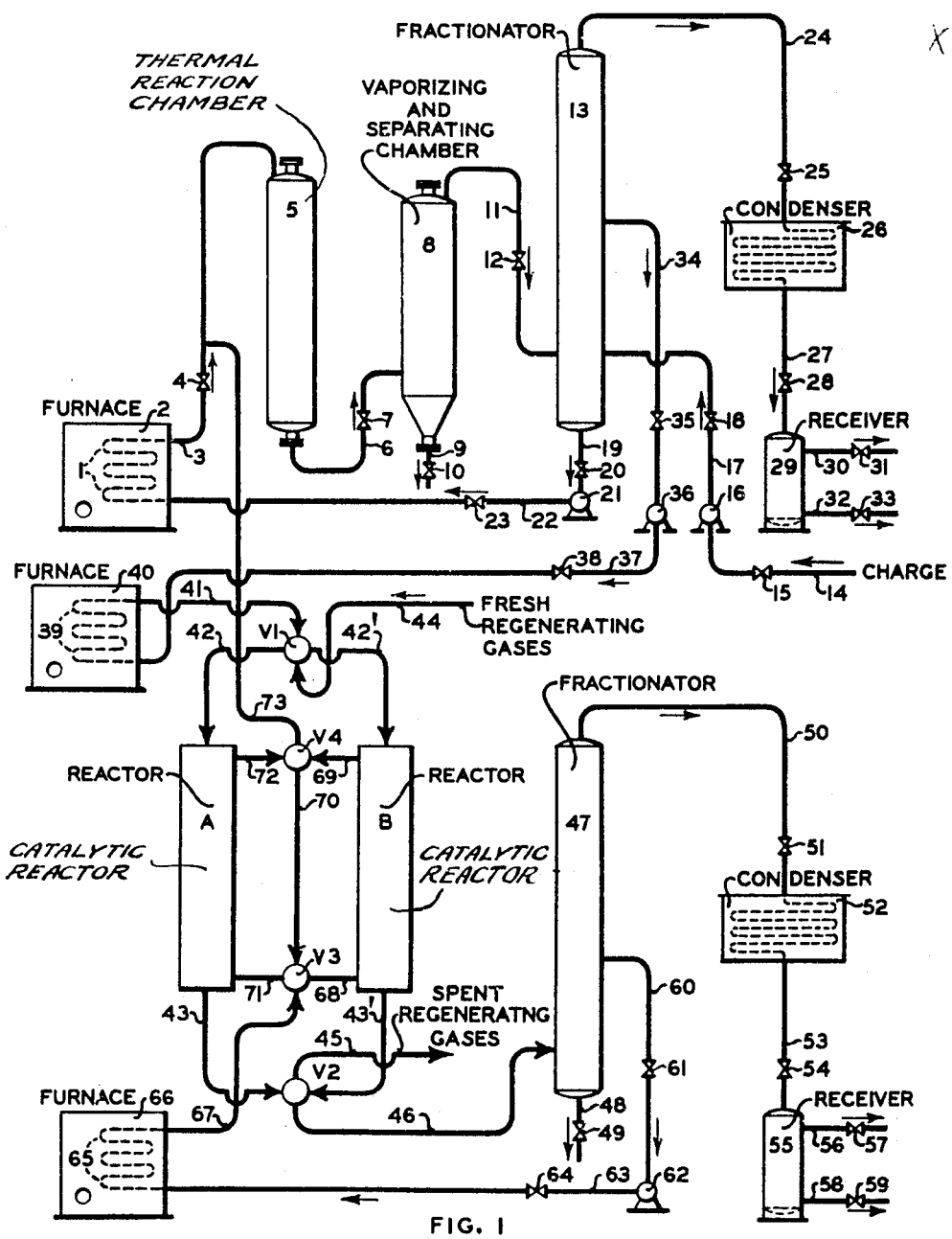

Dec. 8, 1942.  W. L. BENEDICT  2,304,070
HYDROCARBON CONVERSION PROCESS
Filed Nov. 25, 1940

INVENTOR
WAYNE L. BENEDICT
BY Lee J. Gary
ATTORNEY

Patented Dec. 8, 1942

2,304,070

UNITED STATES PATENT OFFICE 2,304,070

HYDROCARBON CONVERSION PROCESS

Wayne L. Benedict, Chicago, Ill., assignor to Universal Oil Products Company, Chicago, Ill., a corporation of Delaware Application November 25, 1940, Serial No. 367,100

15 Claims. (Cl. 196—49)

This invention relates to an improved method for converting hydrocarbon oils into more valuable hydrocarbons. More specifically, it is concerned with a process which involves both thermal and catalytic cracking treatments wherein intermediate conversion products formed in the catalytic cracking treatment are employed as the heat convective medium in supplying heat to the catalytic conversion reaction and in cooling the catalyst regeneration. The present application is a refiling of my earlier application, Serial No. 309,716, filed December 18, 1939.

The general practice in the catalytic treatment of hydrocarbons is to employ an extraneous material, such as combustion gases, molten salts, or some other suitable fluid medium, to supply heat to and conduct heat from the endothermic and exothermic reaction zones, respectively. Generally speaking, however, there are certain disadvantages which accompany an operation employing heat convective media of the type which have found commercial application. On the one hand, the coefficient of heat transfer of the materials and more specifically combustion gases is relatively low and, on the other hand, material, such as molten salts, in most cases, is, relatively speaking, very corrosive, and therefore the materials mentioned, either from the standpoint of heat transfer and corrosion, render the operation involving the catalytic treatment of hydrocarbons considerably more expensive than a thermal cracking treatment. Liquids, generally speaking, have a higher coefficient of heat transfer than gases. However, due to the relatively high temperature employed in the catalytic reactions, molten salts are the only liquid materials which have found any great application, largely due to the fact that extremely high temperatures may be encountered before any decomposition takes place. These materials therefore would be the most desirable if it were not for excessive corrosion encountered in the equipment.

In order to obviate the disadvantages inherent in a catalytic cracking process employing heating or cooling media of the types referred to above, but at the same time obtain results comparable with or better than those obtained from systems employing such media, my invention provides for utilizing intermediate products formed in the process in conducting heat from the exothermic reaction zone and conveying heat to the endothermic reaction zone.

In the catalytic step of my process two or more reaction zones are employed, the fresh or freshly reactivated catalyst in one or more zones being used for effecting conversion of the hydrocarbons subjected to contact therewith, while the catalyst in the other zone or zones is undergoing regeneration by contacting therewith oxygen-containing gases which are used in burning from the catalyst carbonaceous substances deposited thereon. In order to effect the desired heating and cooling in the respective reactors, I prefer to cool the exothermic reaction zone by contacting therewith the intermediate conversion products from the catalytic treatment at the desired temperature level and supplying heat to the endothermic reaction zone by contacting therewith the intermediate conversion products at the same or at a higher temperature than that at which they were discharged from the exothermic reaction zone. Intermediate conversion products formed in a catalytic cracking treatment are known to be extremely refractory and capable of withstanding extreme temperatures and pressures with relatively low rates of cracking. These materials may be employed successfully therefore as the heat convective medium with little danger of extreme excessive coking on the external surfaces of the reaction zones.

In one specific embodiment the invention comprises fractionating the charging oil, together with vaporous conversion products, as hereinafter set forth, to separate fractionated vapors boiling in the range of gasoline which are recovered and to form light and heavy reflux condensates, subjecting said heavy reflux condensate to thermal cracking treatment, commingling the resulting conversion products with intermediate conversion products supplied as hereinafter set forth, and separating from the mixture non-vaporous liquid residue which is recovered, and subjecting the vaporous conversion products separated therefrom to fractionation as hereinbefore set forth, heating and vaporizing said light reflux condensate and subjecting the resulting heated vapors to treatment in a reaction zone containing catalytic material while supplying heat to this zone, as hereinafter set forth, simultaneously reactivating the catalyst in another reaction zone while extracting heat therefrom, as hereinafter set forth, and alternately switching the flow of the reactants and reactivating gases from one reactor to the other, fractionating the conversion products from the first mentioned reaction zone to separate gasoline boiling range hydrocarbons and non-vaporous liquid residue from intermediate conversion products, recovering the gasoline and residue, subjecting said intermediate conversion products to contact with the exterior of the second mentioned reaction zone to absorb the heat produced in regenerating the catalyst contained therein, subsequently passing said intermediate conversion products in contact with the exterior of the first mentioned reaction zone to supply the heat of conversion to the reactants passing therethrough, and thereafter commingling said intermediate conversion products with the conversion products from the thermal cracking treatment, as hereinbefore set forth.

Figure 1 in the accompanying drawing illustrates diagrammatically in side elevation one specific form of the apparatus which may be employed to carry out the broad features of the invention.

Figure 2:
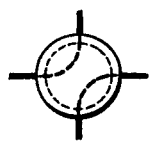
Figure 3:
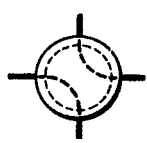

Figures 2 and 3 are details of the two-way inlet and outlet valves diagrammatically indicated in Figure 1, Figure 2 showing a valve in one position and Figure 3 showing the passageways therethrough shifted.

Referring now to the drawing, heavy reflux condensate formed as hereinafter described, is introduced to heating coil 1 and in passing therethrough is raised to the desired conversion temperature which may range, for example, from 850 to 1000° F. and is preferably maintained at this temperature within heating coil 1 for a sufficient period of time for substantial thermal cracking to be effected, heat being supplied from furnace 2. The products leaving heating coil 1 at a superatmospheric pressure ranging, for example, from 100 to 300 pounds or more per square inch are directed through line 3 and valve 4, commingled with the intermediate conversion products separated in the manner to be described more fully later, and the resulting mixture introduced to reaction chamber 5 wherein it is subjected to substantial further cracking at the elevated temperature and pressure. Reaction chamber 5 is preferably maintained at substantially the same or at a slightly reduced pressure relative to that employed on the outlet of heating coil 1 and is preferably insulated to reduce radiation losses therefrom, although no insulation appears in the drawing.

The resulting conversion products leaving reaction chamber 5 are conducted through line 6 and valve 7 to a vaporizing and separating chamber 8 which is preferably operated at a reduced pressure relative to that employed on the outlet of reaction chamber 5 and this may range, for example, from 50 to 200 pounds or more per square inch. The vaporous conversion products are separated from the liquid conversion products in chamber 8 and the latter, due to the reduction in pressure, is subjected to substantial further vaporization to form a non-vaporous liquid residue which is removed from chamber 8 by way of line 9 and valve 10, cooled and recovered as a product of the process or subjected to any further treatment.

Vaporous conversion products, together with vapors evolved in chamber 8, are conducted through line 11 and valve 12 into fractionator 13 wherein they are commingled with charging oil introduced as subsequently described. Fractionator 13, together with the condensing and collecting equipment connected therewith, is preferably operated at substantially the same or slightly reduced pressure relative to that employed in chamber 8, although pressures down to substantially atmospheric may be employed. (The combined materials in fractionator 13 are fractionated therein to separate vaporous hydrocarbons boiling substantially in the range of gasoline from the higher boiling oils and the latter condensed as light and heavy reflux condensates in the fractionating zone. The light reflux condensate, preferably comprises a mixture of hydrocarbons which are suitable as a charging oil for the catalytic treatment, in the case where said catalytic treatment is conducted in substantially the vapor phase.)

Charging oil for the process, which may comprise crude oil, reduced crude, or any desired fraction thereof, is introduced through line 14 and valve 15 to pump 16, which discharges through line 17 and valve 18 into the lower portion of fractionator 13, commingling therein with the vapors introduced as previously described. Heavy reflux condensate formed in fractionator 13, comprising the higher boiling hydrocarbons contained in the vapors and the higher boiling hydrocarbons of the charging stock, is conducted from fractionator 13 through line 19 and valve 20 to pump 21, which discharges through line 22 and valve 23 into heating coil 1, the treatment to which this material is subjected being substantially as described.

Fractionated vapors from fractionator 13 are directed through line 24 and valve 25 to cooling and condensation in condenser 26. Distillate, together with undissolved and uncondensed gases in condenser 26, is directed through line 27 and valve 28 into receiver 29 where the distillate and gases are collected and separated. Gases separated in receiver 29 are removed therefrom by way of line 30 and valve 31 and recovered or subjected to any desired treatment. A portion of the distillate collected and separated in receiver 29 may be returned to the upper portion of fractionator 13 by well known means, not shown, as a cooling and refluxing medium therein, and the remaining portion may be recovered as a product of the process by way of line 32 and valve 33.

Light reflux condensate formed in fractionator 13, as previously described, is conducted through line 34 and valve 35 to pump 36, which discharges through line 37 and valve 38 into heating coil 39. The light reflux condensate in passing through heating coil 39 is vaporized and raised to the desired conversion temperature without substantial pyrolytic cracking being effected, heat being supplied to the oil passing therethrough from furnace 40. The heated vapors from heating coil 39 are conducted through line 41 to valve VI, after which it is subjected to treatment in the manner to be described more fully later.

In the particular case here illustrated, two reactors A and B are employed and each reactor preferably contains a plurality of relatively small diameter tubes containing catalytic material capable of promoting the desired cracking reaction when in a fresh or freshly regenerated state. In addition, each reactor is preferably equipped with a means for introducing a fluid heating or cooling medium around the tubes for the purpose of supplying to or withdrawing heat from the reaction zone. It is not intended that the invention should be limited in this respect, however, for I may employ, if so desired, reactors of the type wherein the catalyst surrounds the tubes and the heating or cooling medium flows through the tubes. One reactor is at all times employed as a cracking zone while the catalyst in the other reactor is being reactivated by passing therethrough a stream of relatively inert gases, (such as combustion gases, for example) containing controlled amounts of air or oxygen. The reactors are alternately operated with respect to the service for which they are employed by means of valves V1 and V2 through which the reactants and reactivating gases are supplied and withdrawn and by means of valves V3 and V4 through which intermediate conversion products employed as a heating and cooling medium are directed.

Any suitable valve arrangement capable of switching the direction of flow of the stream of reactants and the stream of regenerating gases may be employed within the scope of the invention and, for the sake of simplifying the description and illustrating the process without unnecessary complications, each of the switching valves is here illustrated as a single four-way valve in which the position of the two passage-ways therethrough may be shifted as illustrated in Figures 2 and 3.

Assuming that valves V1, V3, and V4 are each adjusted to the position illustrated in Figure 2, and valve V2 is adjusted to the position illustrated in Figure 3, the hydrocarbon vapors in line 41 pass through valve V1 into line 42 and thence into reactor A where they are contacted with a suitable catalytic material contained therein. While the hydrocarbon vapors are in contact with the catalytic material, the endothermic heat of conversion is supplied to the vapors being converted in the manner to be described more fully later.

The preferred cracking catalysts for use in the present process consist in general of a precipitated alumina hydrogen and/or zirconia hydrogel composited with silica hydrogel, the gel composite being washed, dried, formed into particles, and calcined to produce a catalyst mass. The invention, however, is not limited to these particular catalysts, for other catalysts, such as, for example, the hydrosilicates of alumina, acid treated clays, and the like, may be used within the broad scope of the invention.

In the following specification and claims the terms silica, alumina, silica-zirconia, and silica-alumina-zirconia masses are used in the broad sense to designate the synthetic composites referred to above. The preferred catalysts may be prepared by precipitating silica from a solution as a hydrogel within or upon which the alumina and/or zirconia is deposited also by precipitation as hydrogels. The silica hydrogel may conveniently be prepared by acidifying an aqueous solution of sodium silicate by the addition of a required amount of hydrochloric acid. After precipitating, the silica gel is preferably washed until substantially free from alkali metal salts. The washed silica hydrogel is then suspended in a solution of alumina and/or zirconium salts and an alkaline precipitant, such as ammonium hydroxide, ammonium carbonate or ammonium sulfide added to the solution to precipitate aluminum and/or zirconium hydrogels. The final precipitate, comprising essentially hydrated silica and hydrated alumina and/or zirconia, is washed to substantially completely remove water soluble materials and dried at about 300° F. to produce a rather crumbly and granular material which may be ground and pelleted or sized to produce particles of catalyst after which the catalyst particles are calcined at a temperature in the approximate range of 1000 to 1500° F. Various other procedures, such as, for example, co-precipitation of the hydrated gels may be employed, when desired, to produce the preferred catalyst. Temperatures on the order of 600 to 1000° F. and pressures ranging, for example, from substantially atmospheric to 200 pounds or more per square inch superatmospheric may be employed when using the preferred catalyst.

While the hydrocarbon conversion reaction is being accomplished in reactor A, the catalyst in reactor B may be subjected to reactivation treatment by contacting therewith a suitable inert gas, such as combustion gas, containing controlled amounts of air or oxygen. Fresh regenerating gases are introduced to the system through line 44 by means of which they are conducted to valve V1 wherethrough they pass into line 42' and thence into reactor B.

The carbonaceous substances deposited upon the catalyst in the previous processing period are burned therefrom and the exothermic heat of regeneration is absorbed in cooling oil introduced as hereinafter described. Spent regenerating gases from reactor B are directed through line 43' to valve V2 wherethrough they pass into line 45 after which the gases may be exhausted or, when desired, the sensible heat in the gases may be recovered in suitable equipment, not shown, and air or oxygen commingled with the resulting cooled gases and the mixture thereafter returned to reactor B as the fresh regenerating gases.

The conversion products from reactor A are directed through line 43 to valve V2 wherethrough they pass into line 46 by means of which they are supplied to fractionator 47. Heavy non-vaporous liquid residue is separated from the vaporous conversion products in the lower portion of fractionator 47 and removed therefrom by way of line 48 and valve 49, cooled and recovered or subjected to any desired further treatment. The vaporous conversion products supplied to fractionator 47 are fractionated therein to separate vapors boiling substantially in the range of gasoline from the higher boiling intermediate conversion products and the latter condensed in the fractionating zone.

The fractionated vapors separated in fractionator 47 are directed through line 50 and valve 51 to cooling and condensation in condenser 52. Distillate, together with undissolved and uncondensed gases from condenser 52, is directed through line 53 and valve 54 into receiver 55 where the distillate and gas is collected and separated. Gases collected in receiver 55 are removed therefrom by way of line 56 and valve 57. A portion of the distillate collected in receiver 55 may be returned to the upper portion of fractionator 47 by well known means, not shown, as a refluxing and cooling medium, and the remaining portion of the distillate removed from receiver 55 by way of line 58 and valve 59 and recovered as a product of the process.

The intermediate conversion products separated in fractionator 47 are directed through line 60 and valve 61 to pump 62, which discharges through line 63 and valve 64 into heating coil 65. The intermediate conversion products in passing through heating coil 65 are raised to a temperature sufficiently high to initiate combustion of carbonaceous substances, particularly when the heated intermediate conversion products are brought in contact with the exterior of the reaction zone in which the catalyst is undergoing regeneration, heat being supplied by means of furnace 66. The heated intermediate conversion products leaving heating coil 65 are directed through line 67 to valve V3 wherethrough they pass into line 68 and thence into reactor B wherein they are contacted with the exterior of the reaction zone thereby absorbing heat produced in the regeneration reaction. The intermediate conversion products leaving reactor B, having a higher heat content than the entering material, are directed through line 69 to valve V4 wherethrough they pass into line 70 and thence through valve V3 into line 71 by means of which they are introduced to reactor A wherein they are contacted with the exterior of the reaction zone in which the reactants are undergoing conversion. A substantial portion of the heat contained in the intermediate conversion products is imparted to the reactants undergoing conversion in reactor A, thereby supplying heat of conversion thereto. The intermediate conversion products leaving reactor A are directed through line 72 to valve V4 wherethrough they pass into line 73 by means of which they are introduced to line 3, commingling therein with the conversion products leaving heating coil 1, as previously described.

When the heat content above reaction temperature of the intermediate conversion products leaving the exothermic reaction zone is below that required for supplying the necessary heat of conversion in the endothermic reaction zone, some suitable heating means may be interposed between reactors A and B in order to supply additional heat to the intermediate conversion products as they pass from one zone to the other. On the other hand, when the heat content above reaction temperature of the intermediate conversion products is in excess of the amount required in the endothermic reaction zone, some suitable cooling means may be interposed between the two reactors to remove the excess heat.

In the catalytic cracking operation, as above described, when the catalyst in reactor A approaches the state of reduced activity, at which time it is advantageous to apply freshly regenerated catalyst for the treatment of the vapors, the supply of air to the regenerating gas stream is momentarily discontinued so that reactor B is purged of oxygen-containing gases, and after the purging in reactor B is completed, valve V1 is switched to the position in Figure 3 at which time oxygen-free gases are introduced to reactor A and hydrocarbon vapors to reactor B. After a lag corresponding to the time required to drive the vapors from reactor A and the oxygen-free gases from reactor B, valve B2 is switched to the position indicated in Figure 2 at which time oxygen is again admitted to the regenerating gas stream.

Either prior to or subsequent to the switching of valves V1 and V2, valves V3 and V4 may be switched to the position indicated in Figure 3 in order that the proper heating and cooling may be effected in reactors A and B. After the switching of valves V1, V2, V3, and V4, the flow of hydrocarbon vapors in line 41 will be through valve V1 into line 42' and thence to reactor B, while the flow of conversion products from reactor B will be through line 43', valve V2 and line 46. The flow of the conversion products from this point on will be substantially as described. The flow of the fresh regenerating gases, on the other hand, will be through valve V1 into line 42 and thence into reactor A. The spent renegerating gases from reactor A will flow through line 43 to valve V2 and thence into line 45. The flow of the intermediate conversion products in line 67, employed as a heating and cooling medium to the reaction zones, will be through valve V3 into line 71 and thence through reactor A. The intermediate conversion products leaving reactor A flow through line 72, valve V4, and line 70 to valve V3 into line 68 and thence into reactor B. The intermediate conversion products from reactor B are directed through line 69 and valve V4 into line 73, the flow thereafter being substantially as described.

Switching of the stream of hydrocarbon vapors and reactivating gases is periodically repeated by reversing the position of the switching valves so that the partially spent catalytic material in one reactor is continuously being reactivated and the stream of hydrocarbon vapors is continuously converted in the other reactor. The switching valves may be manually operated but, preferably to simplify operation of the process and to avoid mistakes in the operation of the valves, all of the valves will preferably operate from a single time cycle controller of any well known form in accordance with a definite predetermined schedule.

An example of one specific operation of the process is approximately as follows:

Charging oil comprising a 36° A. P. I. gravity Mid-Continent crude oil was fractionated in commingled state with vaporous conversion products formed as hereinafter described, and the gasoline boiling range hydrocarbons corresponding to 45% by volume of the charge were separated from the higher boiling hydrocarbons and recovered as a product of the process. The higher boiling hydrocarbons were condensed as light and heavy reflux condensates in the fractionating zone and the heavy reflux condensate subjected to thermal cracking treatment in a heating coil and communicating reaction chamber at a temperature of 920° F. and at a superatmospheric pressure of 200 pounds per square inch on the outlet of the reaction chamber. Intermediate conversion products formed in a subsequent catalytic cracking treatment were commingled with the conversion products leaving the heating coil of the thermal cracking system prior to their introduction to the reaction chamber and were contained in the mixture of conversion products leaving the reaction chamber. The mixture of conversion products leaving the reaction chamber were introduced to a vaporizing and separating chamber wherein non-vaporous liquid residue corresponding to approximately 16% by volume of the charge was removed and separated from the vaporous conversion products and the latter supplied to a fractionating zone as previously described.

The light reflux condensate formed in the fractionating zone, as previously described, was fractionated and heated to a temperature of 930° F. and the resulting vapors subjected to contact with a silica-alumina-zirconia catalyst in a reaction zone heated as subsequently described. Simultaneously therewith, the catalyst contained in another reaction zone was regenerated by contacting therewith the heated regenerating gases containing approximately 2% by volume of oxygen while cooling this zone as subsequently described. The hydrocarbon conversion products from the catalytic reaction zone were fractionated to separate gasoline boiling range hydrocarbons and nonvaporous liquid residue from the intermediate conversion products and the gasoline corresponding to approximately 21.0% by volume of the charging oil and the liquid residue equivalent to 1.0% were recovered as products of the process.

The intermediate conversion products collected and separated, as previously described, were heated to a temperature of 925° F. and contacted first with the exterior of the reaction zone in which the catalyst was undergoing regeneration to absorb a substantial portion of the heat produced in the regeneration reaction, after which said intermediate conversion products were contacted with the exterior of the reaction zone in which the reactants were undergoing conversion to supply the endothermic heat of conversion and the resulting conversion products were commingled with the conversion products from the thermal cracking treatment prior to their introduction to the reaction chamber, as previously described.

I claim as my invention:

1. In a process for the conversion of hydrocarbon oil wherein heavy components of said hydrocarbon oil are treated thermally and the light components thereof subjected to treatment in substantially the vapor phase in a reaction zone containing catalytic material in the presence of which an endothermic conversion reaction occurs, and alternately switching the flow of hydrocarbon vapors to another reaction zone and subjecting the catalytic material contained in the former reaction zone to reactivation while that in the latter is employed in the conversion reaction, said reactivation involving an exothermic reaction, the improvement which comprises passing intermediate conversion products formed in the catalytic conversion treatment first in contact with the exterior of the reaction zone containing the catalyst undergoing reactivation to absorb heat produced therein, subsequently passing said intermediate conversion products in contact with the exterior of the reaction zone in which the hydrocarbon vapors are undergoing conversion to furnish the endothermic heat of conversion, and thereafter commingling said intermediate conversion products with the conversion products formed in the conversion treatment of said heavy components.

2. In a process for the conversion of hydrocarbon oil wherein heavy components of said hydrocarbon oil are subjected to thermal cracking treatment and the light components thereof subjected to catalytic cracking treatment in substantially the vapor phase in a reaction zone containing catalytic material in the presence of which an endothermic conversion reaction occurs, and alternately switching the flow of hydrocarbon vapors to another reaction zone and subjecting the catalytic material contained in the former reaction zone to reactivation while that in the latter is employed in the conversion reaction, said reactivation involving an exothermic reaction, the improvement which comprises passing intermediate conversion products formed in the catalytic conversion treatment first in contact with the exterior of the reaction zone containing the catalyst undergoing reactivation to absorb heat produced therein, subsequently passing said intermediate conversion products in contact with the exterior of the reaction zone in which the hydrocarbon vapors are undergoing conversion to furnish the endothermic heat of conversion, and thereafter commingling said intermediate conversion products with the conversion products formed in the conversion treatment of said heavy components.

3. In a process for the conversion of hydrocarbon oil wherein heavy components of said hydrocarbon oil are subjected to thermal cracking treatment and the light components thereof subjected to catalytic cracking treatment in substantially the vapor phase in a reaction zone containing catalytic material in the presence of which an endothermic conversion reaction occurs, and alternately switching the flow of hydrocarbon vapors to another reaction zone and subjecting the catalytic material contained in the former reaction zone to reactivation while that in the latter is employed in the conversion reaction, said reactivation involving an exothermic reaction, the improvement which comprises passing heated intermediate conversion products formed in the catalytic conversion treatment first in contact with the exterior of the reaction zone containing the catalyst undergoing reactivation to absorb heat produced therein, subsequently passing said intermediate conversion products in contact with the exterior of the reaction zone in which the hydrocarbon vapors are undergoing conversion to furnish the endothermic heat of conversion, and thereafter commingling said intermediate conversion products with the conversion products formed in the conversion treatment of said heavy components.

4. A process for the conversion of hydrocarbon oil, which comprises fractionating the charging oil, together with the vaporous conversion products formed as hereinafter described, to separate fractionated vapors boiling in the range of gasoline from the higher boiling hydrocarbons, recovering the former, condensing the latter as light and heavy reflux condensates, subjecting said heavy reflux condensate to thermal cracking treatment, separating non-vaporous liquid residue from the vaporous conversion products, recovering the former and fractionating said vaporous conversion products, as hereinbefore set forth, heating and vaporizing said light reflux condensate and subjecting the heated stream of vapors to contact with catalytic material in a reaction zone to which heat is supplied, as hereinafter set forth, simultaneously therewith subjecting the catalyst contained in another reaction zone to regeneration by contacting therewith a stream of oxygen-containing gases while cooling the reaction zone, as hereinafter set forth, fractionating the conversion products from the first mentioned reaction zone to separate gasoline boiling range hydrocarbons and liquid residue from the intermediate conversion products, recovering said gasoline boiling range hydrocarbons and said liquid residue, heating said intermediate conversion products and passing them in the heated state in contact with the exterior of the second mentioned reaction zone to absorb heat produced in reactivating the catalyst contained therein, subsequently passing said intermediate conversion products in contact with the exterior of the reaction zone in which the hydrocarbon vapors are undergoing conversion to furnish the endothermic heat of conversion, and thereafter commingling said intermediate conversion products with the conversion products from said thermal cracking treatment.

5. A process for the conversion of hydrocarbon oil, which comprises fractionating the charging oil, together with the vaporous conversion products formed as hereinafter described, to separate fractionated vapors boiling in the range of gasoline from the higher boiling hydrocarbons, recovering the former, condensing the latter as light and heavy reflux condensates, subjecting said heavy reflux condensate to thermal cracking treatment, separating non-vaporous liquid residue from the vaporous conversion products, recovering the former and fractionating said vaporous conversion products, as hereinbefore set forth, heating and vaporizing said light reflux condensate and subjecting the heated stream of vapors to contact with a catalytic material in a reaction zone to which heat is supplied, as hereinafter set forth, simultaneously therewith reactivating the catalyst contained in another reaction zone by contacting therewith a stream of oxygen-containing gases while cooling the reaction zone, as hereinafter set forth, and alternately switching the separate streams from one reaction zone to the other, fractionating the conversion products from the first mentioned reaction zone to separate gasoline boiling range hydrocarbons and liquid residue from the intermediate conversion products, recovering said gasoline boiling range hydrocarbons and said liquid residue, heating said intermediate conversion products and passing them in the heated state in contact with the exterior of the second mentioned reaction zone to absorb heat produced in reactivating the catalyst contained therein, subsequently passing said intermediate conversion products in contact with the exterior of the reaction zone in which the hydrocarbon vapors are undergoing conversion to furnish the endothermic heat of conversion, and thereafter commingling said intermediate conversion products with the conversion products from said thermal cracking treatment.

6. In a process for the conversion of hydrocarbon oil to produce lower boiling products therefrom wherein the higher boiling portion of a composite feed is subjected to thermal cracking and a lower boiling portion to catalytic cracking in the presence of contact material alternately processed and regenerated, the improvement which comprises passing insufficiently converted hydrocarbons formed in the catalytic step boiling above the desired product in indirect heat exchange relationship successively with contact material undergoing regeneration and contact material used in processing respectively, and thereafter commingling them with reaction products from the thermal cracking step.

7. The process of claim 6 further characterized in that the insufficiently converted hydrocarbons from the catalytic cracking step are heated before utilizing them as a heat exchange fluid to a temperature sufficient to maintain regeneration of the contact material.

8. A process for the conversion of hydrocarbon oil into lower boiling products which comprises maintaining a pyrolytic conversion zone and a catalytic conversion zone, fractionating reaction products from said catalytic conversion zone to separate a desired product from insufficiently converted hydrocarbons and passing at least a portion of said insufficiently converted hydrocarbons in indirect heat exchange relationship successively with catalytic material undergoing regeneration and catalytic material used in processing respectively, and then supplying said insufficiently converted hydrocarbons to the pyrolytic conversion zone.

9. A conversion process which comprises thermally cracking hydrocarbon oil, fractionating the cracked products and subjecting resultant reflux condensate to catalytic cracking in contact with a first catalyst bed, simultaneously subjecting a second catalyst bed, previously used in processing, to exothermic regeneration, separating insufficiently converted hydrocarbons from the catalytically cracked products, passing at least a portion of said insufficiently converted hydrocarbons in indirect heat exchange relation with said second and first catalyst beds in the order named and subsequently supplying the same to the thermal cracking operation.

10. A conversion process which comprises subjecting a relatively heavy hydrocarbon oil to thermal cracking conditions in a heating zone, simultaneously subjecting lighter hydrocarbon oil to catalytic cracking in a system comprising a pair of catalyst beds with each of which the lighter hydrocarbons are alternately contacted, one of the catalyst beds being employed in processing while the other is undergoing exothermic regeneration, separating insufficiently converted hydrocarbons from the products of the catalytic cracking, passing at least a portion of said insufficiently converted hydrocarbons in indirect heat exchange relation with the catalyst bed undergoing regeneration and then with the catalyst bed being employed in processing and thereafter commingling the same with the heated products discharged from said heating zone while said products are at a cracking temperature, separating the resultant mixture into vapors and residue, and fractionating and condensing the vapors.

11. A conversion process which comprises thermally cracking a relatively heavy hydrocarbon oil, simultaneously subjecting lighter hydrocarbon oil to catalytic cracking in a system comprising a pair of catalyst beds with each of which the lighter hydrocarbons are alternately contacted, one of the catalyst beds being employed in processing while the other is undergoing exothermic regeneration, separating insufficiently converted hydrocarbons from the products of the catalytic cracking, passing at least a portion of said insufficiently converted hydrocarbons in indirect heat exchange relation with the catalyst bed undergoing regeneration and then with the catalyst bed being employed in processing and thereafter supplying the same to the thermal cracking operation.

12. The process as defined in claim 10 further characterized in that reflux condensate from the thermal cracking is supplied to the catalytic cracking as at least a part of said lighter oil.

13. The process as defined in claim 11 further characterized in that reflux condensate from the thermal cracking is supplied to the catalytic cracking as at least a part of said lighter oil.

14. The process as defined in claim 6 further characterized in that reflux condensate from the thermal cracking is supplied to the catalytic cracking.

15. The process as defined in claim 8 further characterized in that reflux condensate from the pyrolytic conversion is supplied to the catalytic conversion.

WAYNE L. BENEDICT.